US009853344B2

(12) United States Patent
Hundsdorfer et al.

(10) Patent No.: US 9,853,344 B2
(45) Date of Patent: Dec. 26, 2017

(54) FEED NETWORK ARRANGEMENT FOR GENERATING A MUTLI-ANTENNAE SIGNAL

(71) Applicant: Tesat-Spacecom GmbH & Co. KG, Backnang (DE)

(72) Inventors: Sigurd Hundsdorfer, Erbstetten (DE); Christian Behr, Korb (DE); Andreas Scheffel, Auenwald (DE); Michael Zedler, Stuttgart (DE)

(73) Assignee: Tesat-Spacecom GmbH & Co. KG, Backnang (DE)

( * ) Notice: Subject to any disclaimer, the term of this patent is extended or adjusted under 35 U.S.C. 154(b) by 68 days.

(21) Appl. No.: 14/825,023

(22) Filed: Aug. 12, 2015

(65) Prior Publication Data
US 2016/0049715 A1 Feb. 18, 2016

(30) Foreign Application Priority Data

Aug. 13, 2014 (DE) .......................... 10 2014 011 883

(51) Int. Cl.
*H01P 5/12* (2006.01)
*H01Q 1/02* (2006.01)
(Continued)

(52) U.S. Cl.
CPC ................ *H01P 5/12* (2013.01); *H01Q 1/02* (2013.01); *H01Q 3/40* (2013.01); *H04B 3/56* (2013.01);
(Continued)

(58) Field of Classification Search
CPC .......... H01P 51/12; H01P 1/185; H01P 5/181; H01Q 1/02; H01Q 3/40; H01Q 3/32; H01Q 21/064; H04B 3/56
(Continued)

(56) References Cited

U.S. PATENT DOCUMENTS 4,156,242 A * 5/1979 Proctor .................. H01Q 21/08
343/776
4,812,788 A 3/1989 Wong et al.
(Continued)

FOREIGN PATENT DOCUMENTS

DE 38 50 337 T2 12/1994
EP 1 530 816 B1 6/2006
(Continued)

OTHER PUBLICATIONS

European Search Report issued in European counterpart application No. EP 15 00 2375 dated Jan. 6, 2016, with Statement of Relevancy (Three (3) pages).
(Continued)

*Primary Examiner* — Robert Pascal
*Assistant Examiner* — Kimberly Glenn
(74) *Attorney, Agent, or Firm* — Crowell & Moring LLP

(57) ABSTRACT

A feed network arrangement for generating a multi-antennae signal includes a plurality of coupler devices coupled to one another in waveguide technique, and a plurality of adjustable length of line devices. At least one of the plurality of adjustable length of line devices is coupled to at least one of the plurality of coupler devices, where the one of the plurality of adjustable length of line device is configured to calibrate an electrical length of a supply line of the at least one of the plurality of coupler devices,
In addition, the plurality of coupler devices are arranged such that a plurality of inputs of the feed network arrangement are disposed on a first side of the feed network arrangement and a plurality of outputs of the feed network arrangement are disposed on a second side of the feed network arrangement.

10 Claims, 5 Drawing Sheets

(51) Int. Cl.
  *H01Q 3/40* (2006.01)
  *H04B 3/56* (2006.01)
  *H01P 1/18* (2006.01)
  *H01P 5/18* (2006.01)
  *H01Q 3/32* (2006.01)
  *H01Q 21/06* (2006.01)

(52) U.S. Cl.
  CPC .............. *H01P 1/182* (2013.01); *H01P 5/181* (2013.01); *H01Q 3/32* (2013.01); *H01Q 21/064* (2013.01)

(58) Field of Classification Search
  USPC ........................................................ 333/137
  See application file for complete search history.

(56) References Cited

U.S. PATENT DOCUMENTS

| | | |
|---|---|---|
| 4,879,711 A | 11/1989 | Rosen |
| 5,274,839 A | 12/1993 | Kularajah et al. |
| 5,276,455 A | 1/1994 | Fitzsimmons et al. |
| 7,132,979 B2 | 11/2006 | Langenberg |
| 2005/0012665 A1 | 1/2005 | Runyon et al. |
| 2010/0321238 A1 | 12/2010 | Shen |
| 2011/0304508 A1 | 12/2011 | Remez et al. |
| 2012/0050107 A1* | 3/2012 | Mortazawi ......... H01Q 21/0006 342/372 |

FOREIGN PATENT DOCUMENTS

| | | |
|---|---|---|
| WO | WO 87/07439 A1 | 12/1987 |
| WO | WO 2005/018047 A1 | 2/2005 |

OTHER PUBLICATIONS

Cheng et al., "Miniaturized Multilayer Folded Substrate Integrated Waveguide Butler Matrix", *Progress in Electromagnetics Research C*, vol. 21, Apr. 12, 2011 (Apr. 12, 2011), pp. 45-58, XP055238662 (14 total pages).

* cited by examiner

FEED NETWORK ARRANGEMENT FOR GENERATING A MUTLI-ANTENNAE SIGNAL

CROSS REFERENCE TO RELATED APPLICATION

This application claims priority under 35 U.S.C. §119 from German Patent Application No. 10 2014 011 883.5, filed Aug. 13, 2014, the entire disclosure of which is herein expressly incorporated by reference.

TECHNICAL FIELD

The present invention relates to the signal generation for multi-antennae. In particular, the present invention relates to a feed network arrangement for generating a multi-antennae signal.

BACKGROUND OF THE INVENTION

The publication EP 1 530 816 B1 describes a calibration device for a switchable antennae array into which at least two inputs from among a plurality of inputs of the beam forming network are fed simultaneously and/or jointly and/ or in phase. In this instance, the antennae array includes a plurality of single emitters situated one above the other.

An antennae array or a group or multi-antennae typically includes a plurality of primary emitters, however, at least two emitters situated next to each other and above each other so that a two-dimensional array arrangement results.

These antennae arrays, also known under the expression "smart antennae," or also known as adaptive array antennae, are used in the area of military technology and in the area of mobile data transmission.

For example, beam forming networks are used for this purpose which generate signals having fixed phase relationships for the individual single emitters of the antennae array.

SUMMARY OF THE INVENTION

It is an object of the present invention to provide an improved feed network arrangement for generating multi-antennae signals.

The object of the present invention is achieved by the provisions of the independent claims. Embodiments and further refinements of the present invention are shown in the dependent claims, description and figures.

A first aspect of the present invention relates to a feed network arrangement for generating a multi-antennae signal, and the feed network arrangement includes: a plurality of coupling devices which are coupled to one another in waveguide technique; a plurality of adjustable length of line devices, and at least one of the adjustable length of line devices is coupled to at least one of the coupling devices and the adjustable length of line device is designed to calibrate an electrical length of a supply line of the at least one coupling device; and the coupling devices are arranged in such a manner that inputs of the feed network arrangement are disposed on a first side of the feed network arrangement and the outputs of the feed network arrangement are disposed on a second side of the feed network arrangement.

The present invention provides a coupler network for a flexible and phase controlled power combination and enables a sufficiently ensured phase stability in all operating modes.

The present invention enables a compact and stable architecture of the feed network arrangement or coupler network in waveguide technique, having sufficiently high thermal conductivity between the dissipative couplers or coupler devices.

The present invention advantageously enables a vertical integration by way of adapter plates or adapter plate devices designed in a sufficiently small manner, which enable an individual adaptation to the thermal structure of base plates. The present invention advantageously enables that the adjustable lengths of line or the adjustable length of line devices are designed so to calibrate an electrical length between the couplers.

The present invention advantageously enables to prevent an exceeding of previously determined threshold values for occurring temperature differences and, in this manner, to prevent resulting variations in electrical path lengths and, thus, to prevent occurring phase drifts within the feed network or within the feed network arrangement.

The present invention advantageously provides a feed network arrangement by way of multi-shell technique, and adjustable E and H couplers may be connected in an alternating manner to 180° waveguide curves.

The present invention advantageously enables a spatial separation of inputs and outputs, and, for example, a coupler network may be advantageously designed in such a manner so that the inputs are disposed on one side and the outputs are disposed on the other, opposite side.

Furthermore, the present invention enables to prevent connections which extend over a flange plane.

The present invention provides a coupler network for supplying an antennae array, and, for example, horn emitters, may be used as emitter elements of the antennae array.

Advantageous embodiments of the present invention are referenced in the dependent claims.

An advantageous embodiment of the present invention provides that the coupler devices are situated in such a manner that the first side is opposite of the second side.

For this purpose, the term "opposite," as used by the present invention, may mean or specify that the first side and the second side constitute two sides located opposite of each other and, for example, are aligned in a parallel manner by a maximum angular deviation of less than 10°. Put in other words, the first side of the feed network arrangement constitutes an upper side of the feed network arrangement and the second side constitutes a bottom side of the feed network arrangement. This advantageously enables to provide a spatial separation of the inputs and outputs of the feed network arrangement as great as possible and to prevent electrical interferences or couplings between inputs and outputs.

A further advantageous embodiment of the present invention provides that the plurality of coupler devices is situated on up to eight, preferably up to six and particularly preferably up to five different base plates. This advantageously enables that a limited number of component groups is used for manufacturing the feed network arrangement.

A further advantageous embodiment of the present invention provides that the coupler devices respectively have an adapter plate device designed to change the thermal conductivity between the coupler devices and the base plates.

For example, a thermal contact surface changeable or adjustable in size may be provided between the base plate and the coupler device as an adapter plate device. Despite different, dominating thermal conditions, this advantageously enables to provide an even temperature for the plurality of coupler devices mounted on the base plate.

For example, the adapter plate device may also be designed to adjust the size of the thermal contact surface between the base plate and the coupler device according to an adjustable target value of the thermal conductivity between the base plate and the coupler device.

A further advantageous embodiment of the present invention provides that the feed network arrangement is designed to be produced by way of multi-shell technique. This enables a modularized structure, and the complete system may be simply and cost effectively assembled along defined points using standardized single components. Furthermore, an efficient integration and a simple exchange of components, if they are damaged, may thereby be carried out.

A further advantageous embodiment of the present invention provides that the feed network arrangement is designed as a Butler matrix. For example, the feed network arrangement may be designed as a 1×1 Butler matrix, a 2×2 Butler matrix, a 4×4 Butler matrix or an 8×8 Butler matrix. This advantageously enables a high integration density of the feed network arrangement.

A further, advantageous embodiment of the present invention provides that at least one coupler device of the plurality of coupler devices is designed as an E-coupler. This advantageously enables a secure, broadband operation of the feed network arrangement.

The term "E-coupler," as used in the present invention, includes, for example, a capacitive coupler which couples, by in-coupling an electrical field component of an electrical active power, into a cavity coupled to output ports.

A further advantageous embodiment of the present invention provides that at least one coupler device of the plurality of coupler devices is designed as an H-coupler. The term "H-coupler," as used in the present invention, references, for example, a coupler causing an inductive coupling. For example, an occurring electrical active power is transmitted to a second resonator by excluding a resonator. For this reason, the coupler devices are able to be simply designed as calibratable coupler devices.

A further advantageous embodiment of the present invention provides that at least one coupler device of the plurality of coupler devices is designed as a 3-dB coupler.

A further advantageous embodiment of the present invention provides that the plurality of coupler devices are at least partially coupled to one another via 30°, 45°, 90° or 180° waveguide curves.

The described embodiments and further refinements of the present invention may be combined with one another as desired.

Further possible designs, further refinements and embodiments of the present invention also include combinations not explicitly mentioned above or subsequently with reference to the features described in the exemplary embodiments of the present invention.

BRIEF DESCRIPTION OF THE FIGURES

The appended drawings are intended to convey a further understanding of the embodiments of the present invention. The appended drawings illustrate embodiments and within the context of the description serve to explain concepts of the present invention.

Other specific embodiments and many of the mentioned advantages are obtained with reference to the drawings. The elements of the present drawings are not necessarily shown true to scale in relation to one another.

BRIEF DESCRIPTION OF THE DRAWINGS

Figure 1:
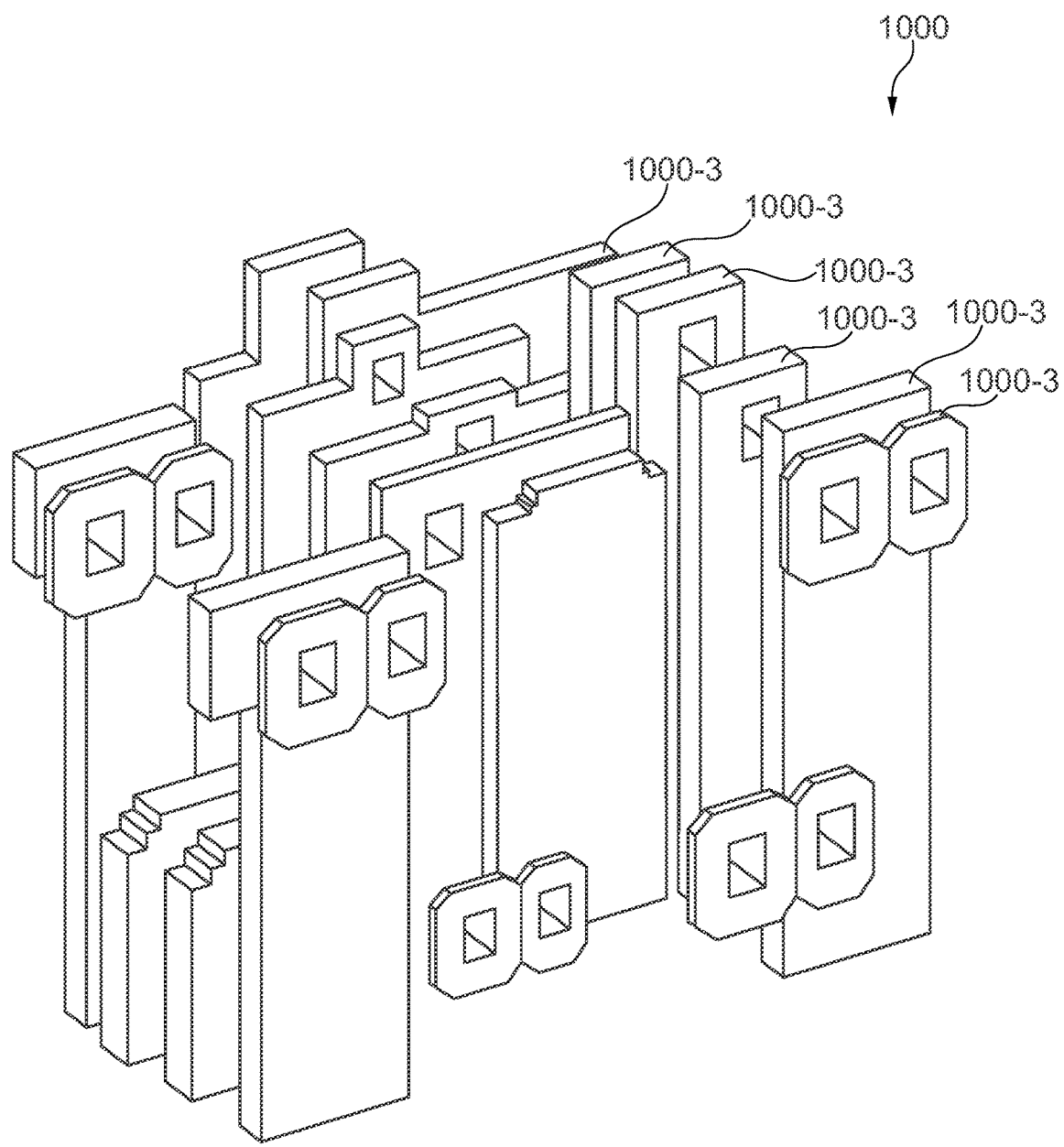
Figure 2:
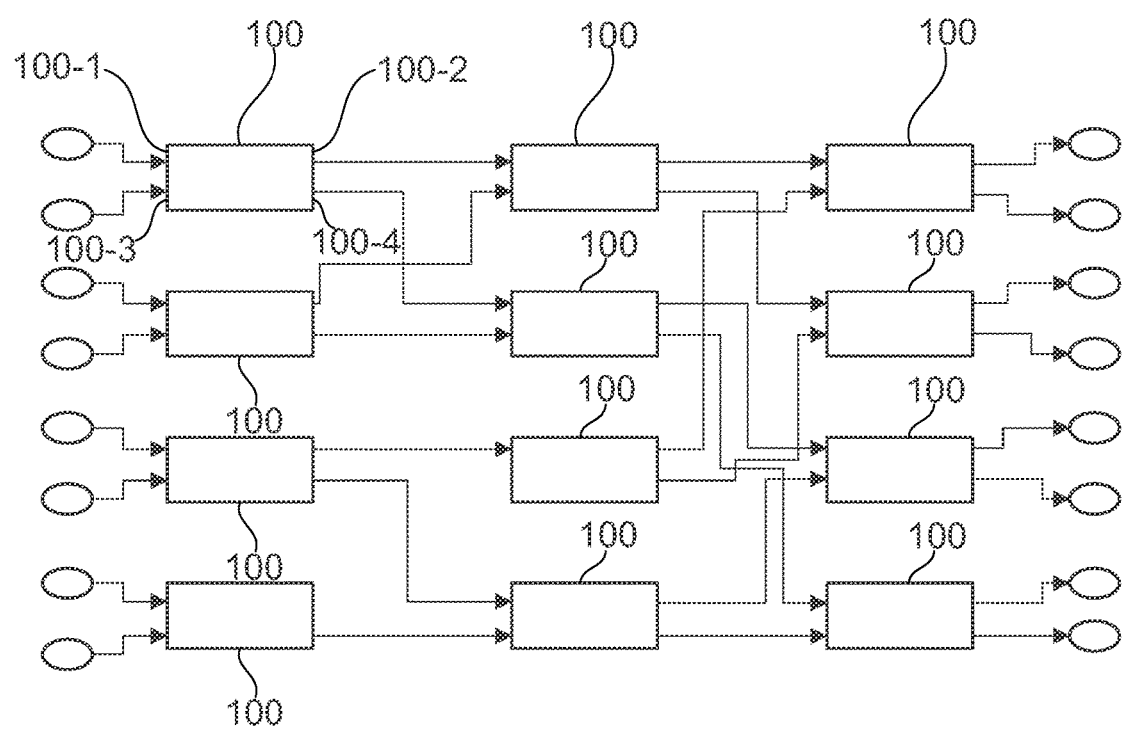
Figure 3:
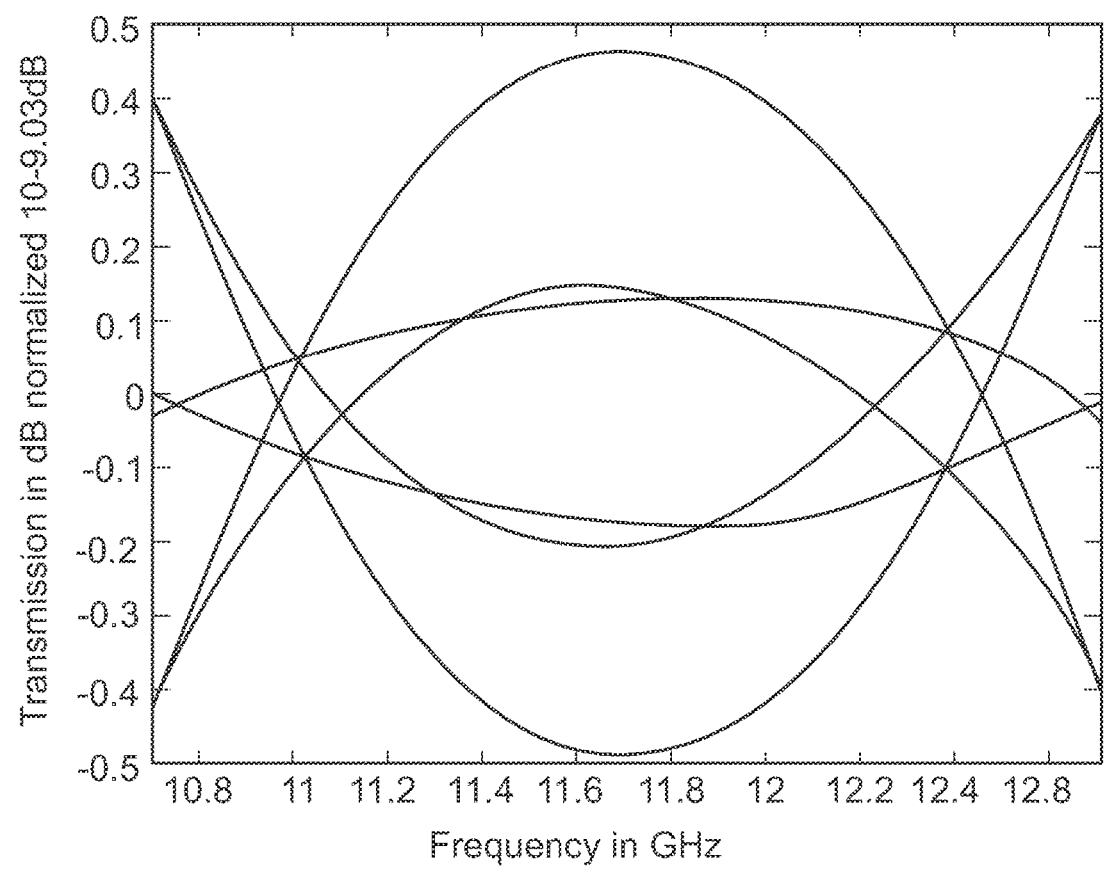
Figure 4:
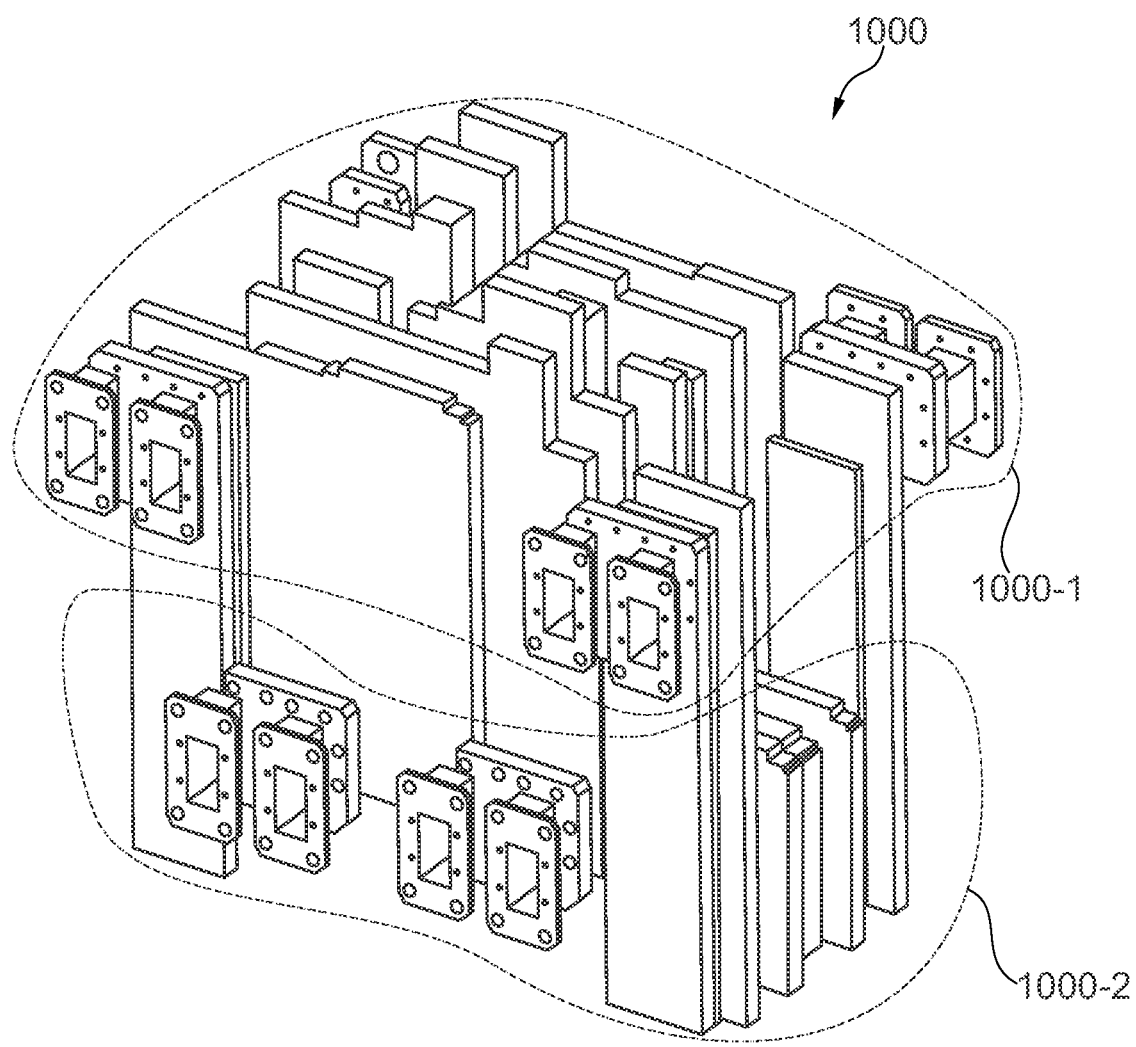
Figure 5:
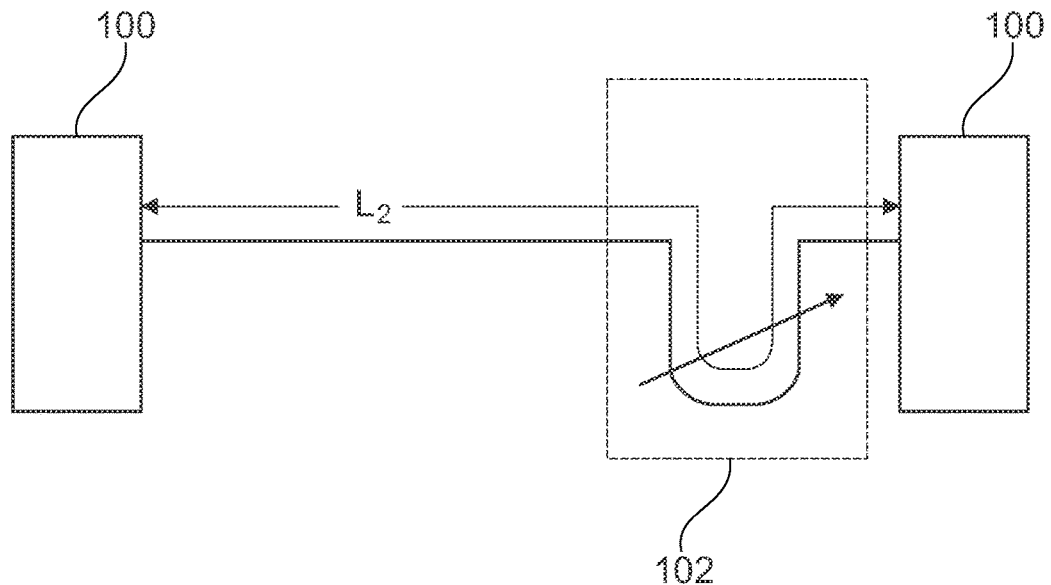
Figure 6:
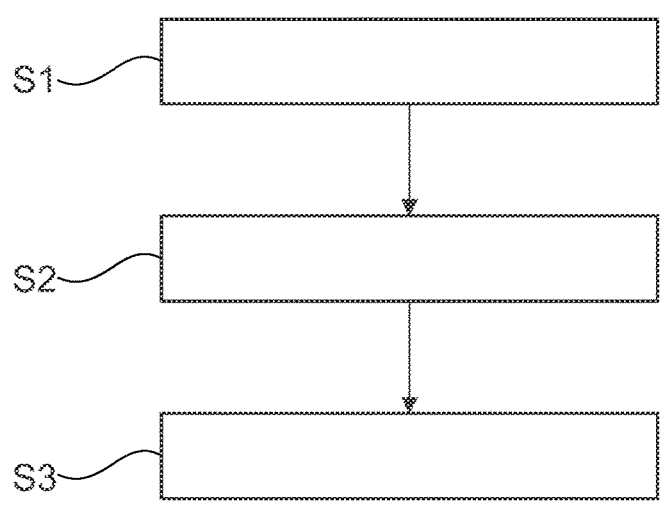

FIG. 1 shows a schematic illustration of a feed network arrangement for generating a multi-signal according to an embodiment of the present invention;

FIG. 2 shows a schematic illustration of a feed network arrangement for generating a multi-signal according to a further embodiment of the present invention;

FIG. 3 shows a schematic illustration of a diagram of a transmission coefficient of an 8×8 Butler matrix for explaining the present invention;

FIG. 4 shows a schematic illustration of a feed network arrangement for generating a multi-antennae signal according to a further embodiment of the present invention;

FIG. 5 shows a schematic illustration of a feed network arrangement for generating a multi-antennae signal according to a further embodiment of the present invention; and FIG. 6 shows a schematic illustration of a flow diagram of a method for producing a feed network arrangement according to an embodiment of the present invention.

In the figures of the drawings, the same reference characters reference the same or analogue elements, parts, components or method steps of the present invention, provided that nothing to the contrary is mentioned.

DETAILED DESCRIPTION OF THE EXEMPLARY EMBODIMENTS

FIG. 1 shows a feed network arrangement for generating a multi-signal according to a further embodiment of the present invention.

A feed network arrangement 1000 for generating a multi-antennae signal includes, for example, a plurality of coupler devices 100, a plurality of adjustable length of line devices 102 and a plurality of base plates 1000-3.

The plurality of coupler devices 100 may be coupled to one another in waveguide technique. In one embodiment of the present invention, the plurality of coupler devices 100 may be situated on up to eight, preferably on up to six and particularly preferably on up to five different base plates 1000-3, as illustrated in FIG. 1.

Base plates 1000-3 may, for example, be manufactured out of aluminum or an alloy featuring aluminum.

This mechanical integration of the coupler devices 100 onto the base plates 1000-3 enables a sufficiently good thermal coupling of the coupler devices 100 and the waveguides so that a sufficiently stable input and output transmission power for different load scenarios in regard to the operating temperature and in regard to the required output load may be provided.

For example, at least one adjustable length of line device 102 of the plurality of adjustable length of line devices is coupled to at least one coupler device 100. Adjustable length of line device 102 may, for example, be designed to calibrate the electrical length of a supply line of the at least one coupler device 100.

FIG. 2 shows a plurality of coupler devices 100 which form a feed or coupler network arrangement 1000.

The inputs are on the left side of feed or coupler network arrangement 1000 illustrated in FIG. 2, and the outputs are on the right side.

For example, feed network arrangement 1000 includes eight inputs and eight outputs.

In one embodiment of the present invention, coupler devices 100 may be designed, for example, as E-couplers, H-couplers or 3-dB couplers and have, for example, four ports 100-1, 100-2, 100-3, and 100-4.

Furthermore, coupler device 100 may also be designed as a 3-dB branch line coupler or as a directional coupler for distributing the power in a defined relationship and having a defined phase relationship. A directional coupler is a component of the high frequency technology and serves the purpose of branching-off a portion of electromagnetic waves running in a waveguide in a directional manner from such a waveguide.

An electrical active power entering, for example, port 100-1 of coupler device 100 is distributed to ports 100-2 and 100-3 of coupler device 100.

Forth port 100-4 of coupler device 100 may be electrically decoupled from the other ports of coupler device 100.

In this instance, the electrical active power may be in-coupled inductively—H-coupler—or capacitively—E-coupler. Furthermore, an absorber having appropriate power, which is designed according to the mismatches at ports 100-2 and 100-3 of coupler device 100, may be provided at fourth port 100-4.

In this instance, coupler device 100 may be used to provide a power distribution in a defined relationship and having a defined phase relationship between the ports.

Feed network arrangement 1000 may, for example, be designed as an 8×8 Butler matrix so to enable an MPA (multi-port amplifier) realization, in German referred to as "Mehrfachverstärker."

Furthermore, feed or coupler network 1000 may have a plurality of filters or harmonic filters.

In this instance, feed network arrangement 1000 may be designed to reduce the footprint and to provide a compact integration. For example, this may be achieved by a realization in a five-layer structure.

Feed network arrangement 1000 may, for example, be designed in a frequency range of 10.0 to 15.0 GHz in a type WR 75.

In one embodiment of the present invention, feed network arrangement 1000 advantageously enables, for example, the possibility of fewer space requirements, a high electrical phase stability and a smaller effect from thermal variations.

In one embodiment of the present invention, feed network arrangement 1000 has, for example, dimensions ranging from up to 200 mm in length, 150 mm in width and 200 mm in height. For example, feed network arrangement 100 has a mass of up to 3500 g.

FIG. 3 shows a schematic illustration of a transmission coefficient of an 8×8 Butler matrix for explaining the present invention.

FIG. 3 illustrates a diagram for explaining the frequency dependence of a transmission coefficient.

The x-axis of the diagram shows a frequency range of, for example, 10.8 to 12.6 GHz; the transmission is input as dB on the y-axis of the diagram, and the transmission is normalized to −9.03 dB.

The transmission characteristic curves of feed network arrangement 1000 in FIG. 3 show an absolute insertion loss of less than 0.2 dB, a port isolation better than 26 dB and a transmission phase change of less than 1.5°. The load capacity of feed network arrangement 1000 amounts in reference to the mechanical limitations to, for example, 8×220 W plus a margin.

The characteristic curves shown in FIG. 3 show a representative set of measurements of the transmission characteristic of different and representative (signal) paths.

FIG. 4 shows feed network arrangement 1000 according to a further embodiment of the present invention.

A feed network arrangement 1000 for generating a multi-antennae signal includes, for example, a first side 1000-1 and a second side 1000-2.

For example, inputs of feed network arrangement 1000 may be disposed on first side 1000-1 and outputs of feed network arrangement 1000 may be disposed on second side 1000-2.

This advantageously enables to provide a spatial separation of inputs and outputs of feed network arrangement 1000.

In one embodiment of the present invention, a plurality of coupler devices 100 is situated on base plates 1000-3 in such a manner that first side 1000-1 of feed network arrangement 1000 is opposite of second side 1000-2 of feed network arrangement 1000.

In other words, first side 1000-1 constitutes an upper side of feed network arrangement 1000 and second side 1000-2 constitutes a bottom side of feed network arrangement 1000.

FIG. 5 shows a schematic illustration of a feed network arrangement for generating a multi-signal according to a further embodiment of the present invention.

Feed network arrangement 1000 includes, for example, an adjustable length of line device 102, which is coupled with at least one coupler device 100 or, for example, with two coupler devices 100, as shown in FIG. 5.

Furthermore, adjustable length of line device 102 may be designed for the purpose of calibrating an electrical length L2 of a supply line of coupler device 100 or, for example, between two coupler devices 100, as shown in FIG. 5.

Adjustable length of line device 102, also known under the term "phase stretcher" or "line stretcher," may be interposed between two coupler devices 100 or situated at an inlet or an outlet of a coupler device 100.

FIG. 6 shows a schematic illustration of a flow diagram of a method for generating a feed network arrangement according to an embodiment of the present invention.

In a first step of the method for generating a feed network arrangement, for example, a providing 51 of a plurality of coupler devices 100 occurs, which are coupled to one another in waveguide technique.

In a second step of the method, for example, a providing S2 of a plurality of adjustable length of line devices 102 occurs, and at least one of adjustable length of line devices 102 is coupled to at least one of coupler devices 100 and adjustable length of line device 102 is designed to calibrate an electrical length of a supply line of the at least one coupler device 100.

In a third step of the method, for example, an arrangement S3 of inputs of feed network arrangement 1000 occurs on a first side 1000-1 and an arrangement of outputs occurs on a second side 1000-2.

In a further step of the method for generating a feed network arrangement, for example, a calibration of electrical paths lengths occurs between coupler devices 100.

In a further step of the method for generating a feed network arrangement, for example, a change of a thermal conductivity occurs between coupler devices 100 and base plates 1000-3.

Even though the present invention has been previously described on the basis of preferred exemplary embodiments, it is not limited to these embodiments but may be modified in many ways. In particular, the present invention may be changed or modified in many ways without departing from the core of the present invention.

In addition, it is to be mentioned that "including" and "having" does not exclude other elements or steps and "a" does not exclude a plurality.

Furthermore, it is to be highlighted that features or steps which have been described in reference to one of the exemplary embodiments mentioned above may also be used in combination with other features or steps of other exemplary embodiments described above. Reference characters in the claims are not to be understood as limitations.

What is claimed is:

1. A feed network arrangement for generating a multi-antennae signal, wherein the feed network arrangement comprises:
   a plurality of coupler devices coupled to one another in waveguide technique; and
   a plurality of adjustable length of line devices, wherein at least one of the plurality of adjustable length of line devices is coupled to at least one of the plurality of coupler devices,
   wherein the at least one of the plurality of adjustable length of line devices is configured to calibrate an electrical length of a supply line of the at least one of the plurality of coupler devices,
   wherein the plurality of coupler devices are arranged such that a plurality of inputs of the feed network arrangement are disposed on a first side of the feed network arrangement and a plurality of outputs of the feed network arrangement are disposed on a second side of the feed network arrangement, and
   wherein the plurality of coupler devices is situated on up to eight different base plates.

2. The feed network arrangement according to claim 1, wherein the plurality of coupler devices are arranged such that the first side is situated opposite of the second side.

3. The feed network arrangement according to claim 2, wherein the plurality of coupler devices is situated on up to eight different base plates.

4. The feed network arrangement according to claim 1, wherein each the plurality of coupler devices have an adapter plate device configured to change the thermal conductivity between the plurality of coupler devices and the base plates.

5. The feed network arrangement according to claim 3, wherein each the plurality of coupler devices have an adapter plate device configured to change the thermal conductivity between the plurality of coupler devices and the base plates.

6. The feed network arrangement according to according to claim 1, wherein the feed network arrangement is designed as a Butler matrix.

7. The feed network arrangement according to according to claim 1, wherein the at least one of the plurality of coupler devices is configured as an E-coupler.

8. The feed network arrangement according to according to claim 1, wherein the at least one of the plurality of coupler devices is designed as an H-coupler.

9. The feed network arrangement according to claim 1, wherein the at least one of the plurality of coupler devices is designed as a 3-dB coupler.

10. The feed network arrangement according to claim 1, wherein the plurality of coupler devices are at least partially coupled to one another via 30°, 45°, 90° or 180° waveguide curves.

* * * * *